(12) United States Patent
Rohlfing et al.

(10) Patent No.: US 11,143,180 B2
(45) Date of Patent: *Oct. 12, 2021

(54) METHOD FOR OPERATING A MULTI-PHASE PUMP AND APPARATUS THEREFOR

(71) Applicant: ITT BORNEMANN GmbH, Obernkirchen (DE)

(72) Inventors: Gerhard Rohlfing, Hille (DE); Jens-Uwe Brandt, Rinteln (DE)

(73) Assignee: ITT Bornemann GmbH, Obernkirchen (DE)

( * ) Notice: Subject to any disclaimer, the term of this patent is extended or adjusted under 35 U.S.C. 154(b) by 5 days.

This patent is subject to a terminal disclaimer.

(21) Appl. No.: 15/602,472

(22) Filed: May 23, 2017

(65) Prior Publication Data
US 2017/0254328 A1 Sep. 7, 2017

Related U.S. Application Data

(63) Continuation of application No. 14/405,314, filed as application No. PCT/EP2013/002260 on Jul. 31, 2013, now Pat. No. 9,689,385.

(30) Foreign Application Priority Data

Jul. 31, 2012 (DE) .......................... 102012015064.4

(51) Int. Cl.
B01D 45/12 (2006.01)
F04C 13/00 (2006.01)
(Continued)

(52) U.S. Cl.
CPC ........ F04C 13/005 (2013.01); B01D 21/0018 (2013.01); B01D 21/2494 (2013.01);
(Continued)

(58) Field of Classification Search
CPC ...... F04C 13/005; F04C 15/06; F04C 13/008; F04C 3/085; F04C 11/001; F04C 2/107;
(Continued)

(56) References Cited

U.S. PATENT DOCUMENTS 2,381,695 A * 8/1945 Sennet ...................... F04C 2/16
417/252
3,314,599 A * 4/1967 Bode ...................... B01D 45/08
418/99

(Continued)

FOREIGN PATENT DOCUMENTS

| DE | 102008018407 | 10/2009 |
| DE | 102010019238 | 11/2011 |
| GB | 2405906 | 3/2005 |
| WO | 9427049 | 11/1994 |
| WO | 2011137892 | 11/2011 |

Primary Examiner — Dung H Bui
(74) Attorney, Agent, or Firm — Carter, DeLuca & Farrell LLP; George Likourezos; Bret P. Shapiro

(57) ABSTRACT

The invention concerns a method and an apparatus for operating a multi-phase pump which has a suction-side inlet (10) and a discharge-side outlet (20) and which pumps a multi-phase mixture charged with solids, comprising the following steps:

Figure 1:
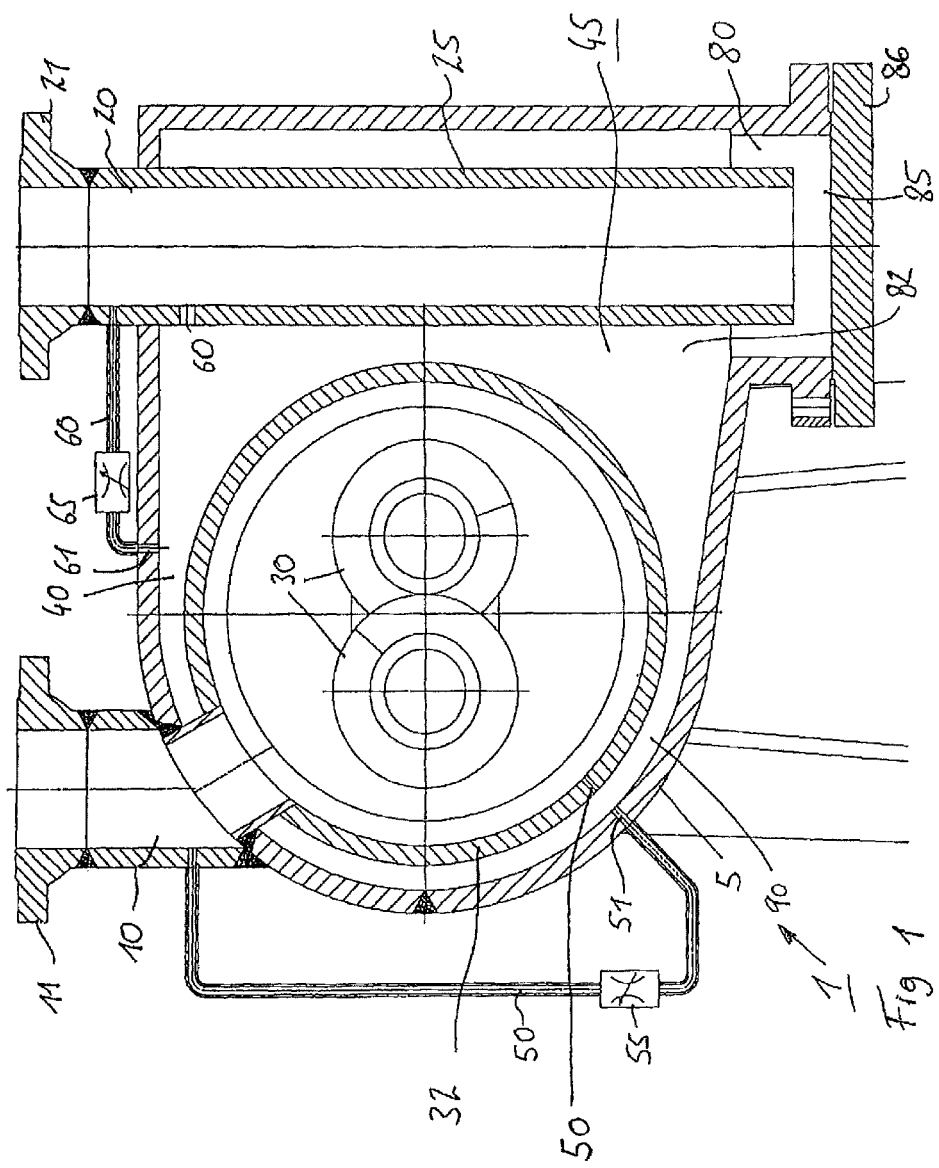

a. pumping a multi-phase mixture into a discharge-side separation chamber (45), b. separating a gaseous phase from a liquid phase and a solid phase in the separation chamber (45), c. separating the liquid phase from the solid phase in the separation chamber (45), and d. supplying a portion of the liquid phase freed from the solid phase to the suction side.

14 Claims, 7 Drawing Sheets

(51) Int. Cl.
*B01D 45/16* (2006.01)
*B01D 45/08* (2006.01)
*B01D 21/00* (2006.01)
*B01D 21/24* (2006.01)
*B01D 21/34* (2006.01)
*F04B 3/00* (2006.01)
*F04B 15/00* (2006.01)
*F04C 2/107* (2006.01)
*F04C 11/00* (2006.01)
*F04C 3/08* (2006.01)
*F04C 15/06* (2006.01)
*B04C 3/06* (2006.01)
*B04C 3/00* (2006.01)
*F04C 2/16* (2006.01)

(52) U.S. Cl.
CPC ............ *B01D 21/34* (2013.01); *B01D 45/08* (2013.01); *B01D 45/12* (2013.01); *B01D 45/16* (2013.01); *F04B 3/00* (2013.01); *F04B 15/00* (2013.01); *F04C 2/107* (2013.01); *F04C 3/085* (2013.01); *F04C 11/001* (2013.01); *F04C 13/001* (2013.01); *F04C 13/008* (2013.01); *F04C 15/06* (2013.01); *B04C 3/06* (2013.01); *B04C 2003/006* (2013.01); *F04C 2/16* (2013.01); *F04C 13/007* (2013.01); *F04C 2210/24* (2013.01); *F04C 2240/806* (2013.01)

(58) Field of Classification Search
CPC ...... F04C 13/001; F04C 2210/24; F04C 2/16; F04C 2240/806; F04C 13/007; B01D 21/34; B01D 21/0018; B01D 21/2494; B01D 45/16; B01D 45/12; B01D 45/08; F04B 3/00; F04B 15/00; B04C 3/06; B04C 2003/006
See application file for complete search history.

(56) References Cited

U.S. PATENT DOCUMENTS

| | | | |
|---|---|---|---|
| 3,473,300 A * | 10/1969 | Kurt | B01D 45/12 55/302 |
| 3,559,809 A * | 2/1971 | Barmore | B01D 21/0012 210/333.1 |
| 6,033,577 A | 3/2000 | Braband et al. | |
| 6,045,338 A * | 4/2000 | Morita | F01L 1/34406 123/90.17 |
| 6,214,092 B1 | 4/2001 | Odom et al. | |
| 6,358,411 B1 * | 3/2002 | McKinney | B01D 21/0018 210/170.08 |
| 6,662,951 B1 | 12/2003 | Fellers | |
| 2005/0274651 A1 | 12/2005 | Daniels et al. | |
| 2007/0274842 A1 | 11/2007 | Campen et al. | |
| 2009/0120638 A1 | 5/2009 | Shaw | |
| 2010/0054963 A1 * | 3/2010 | Yokoi | F04C 14/26 417/310 |
| 2010/0278671 A1 * | 11/2010 | Ghasripoor | F04C 15/0088 418/1 |
| 2010/0278672 A1 * | 11/2010 | Kothnur | F04C 13/008 418/1 |
| 2010/0278673 A1 * | 11/2010 | Kothnur | F04C 2/16 418/1 |
| 2011/0064592 A1 | 3/2011 | Jaeschke et al. | |
| 2011/0103987 A1 | 5/2011 | Kothnur et al. | |
| 2012/0048113 A1 | 3/2012 | Anderson et al. | |
| 2013/0233390 A1 | 9/2013 | Jaeschke et al. | |
| 2014/0130673 A1 * | 5/2014 | Cabourdin | B01D 46/2407 95/268 |
| 2015/0083651 A1 | 3/2015 | Jons et al. | |
| 2015/0101487 A1 * | 4/2015 | Ikushima | B01D 46/0086 96/417 |
| 2016/0123227 A1 * | 5/2016 | Murray | F02C 7/052 55/337 |
| 2017/0370360 A1 * | 12/2017 | Sutton | F16H 61/444 |

\* cited by examiner

METHOD FOR OPERATING A MULTI-PHASE PUMP AND APPARATUS THEREFOR

The invention concerns a method for operating a multi-phase pump which has a suction-side inlet and a discharge-side outlet which pumps a multi-phase mixture charged with solids. The invention also concerns an apparatus for pumping a multiphase mixture charged with solids by means of a multiphase pump which has a suction-side inlet and a discharge-side outlet, with a discharge-side separation means in which a liquid phase is separated from a gaseous phase and a recirculation line through which the separated liquid phase is transferred to the suction side.

In particular with respect to the extraction of hydrocarbons, i.e. the extraction of petroleum and natural gas, mixtures of substances are extracted which have a very irregular composition. There may be alternating streams with a pure gas component as well as streams with a 100% fluid component. Predictions about the duration of individual phases of extraction or the composition of multiphase mixtures are impossible. It is possible in principle to separate the individual phases from one another prior to pumping the multiphase mixture, i.e. to separate the gas phase and the liquid phase from one another in a separator such that only the gas phase or liquid phase is transferred to the respective pumping means. Such a method is associated with high apparatus and logistical costs.

In order to avoid an upstream separator, so-called multi-phase pumps are employed which generally operate on the basis of a multi-spindle screw pump.

A pumping process for operating a multiphase screw pump and pump with at lease one feed screw surrounded by a housing is known from WO 94/27049 A1. The housing has at least one intake stub and at least one discharge stub, with the intake medium being conveyed parallel to the screw shaft in a continuous low-pulse stream and continuously discharged at the discharge stub. A separation of the liquid phase from the gaseous phase takes place in the pressure chamber. On the discharge side a partial liquid volume of the separated liquid phase is dispensed into the intake area, recirculated, and thus kept in circulation in order to provide a seal and cooling. For purposes of separation, the flow rate of the exiting medium on the discharge side is reduced. A liquid bypass line is disposed in the pressure chamber at a depth sufficient to provide permanent liquid circulation. The bypass line connection is disposed beneath the pump housing.

The increased demand for hydrocarbons has led, among other things, to the situation where the easily-reached and highly productive extraction sites have been largely exploited. Therefore, deposits which are less productive or which have a greater proportion of solids in the multiphase mixture are increasingly being exploited. In addition, efforts are being made to lengthen the exploitation of deposits which have already been tapped by means of so-called fracking or to increase the overall gas and liquid permeability of a rock layer by means of crack formation. This also leads to an increased proportion of solids in the multiphase mixture to be pumped.

With increased proportions of solids the prior art device has the problem that, because of the deep arrangement of the recirculation line, solids in the reduced-flow region which sink to the bottom are also recirculated, which leads to increased wear on the screws and the pump housing. There is also the danger that the recirculation line will be plugged by such solid substances.

It is the object of the present invention to provide a method and an apparatus by which the disadvantages of the prior art may be avoided or reduced. According to the invention this object is achieved by means of a method having the features of the principal claim and an apparatus having the characteristics of the subordinate claim. Advantageous configurations and additional embodiments of the invention are disclosed in the dependent claims, the written description and in the drawings.

The method according to the invention for operating a multiphase pump which has a suction-side inlet and a discharge-side outlet and which pumps a multi-phase mixture charged with solids provides that the multi-phase mixture is pumped into a discharge-side separation chamber, that a gaseous phase is separated from a liquid phase and a solid phase within the separation chamber, that furthermore the liquid phase is separated from the solid phase in the separation chamber and that a portion of the liquid phase freed from the solid phase is transferred to the suction side in order to produce, on the one hand, a gap seal within a screw pump and, on the other hand, to facilitate the removal of the heat of compression. The separation of the liquid phase from the solid phase has the advantage that the liquid phase, freed as much as possible from the solid phase, is used for recirculation, for lubrication of the screws, and for transporting away the heat of compression within the multiphase pump, thereby reducing wear on the moving parts of the multiphase pump. The heat removal is equalized and the solid particles are furthermore prevented from being kept in permanent circulation. The separation of the solid phase and the liquid phase can be carried out in several steps, so that multiple separation steps, one behind the other, are available to ensure that, to the extent possible, no solid particles reach the recirculation line and are transported to the suction side.

In a further embodiment of the invention, the solid phase removed in the separation chamber is transported out of the separation chamber. This is particularly advantageous if the infeed conditions and flow conditions within the separation apparatus do not readily enable a discharge of the settled solid phase. The separation chamber may be integrated in a separate module, in a section of the pump housing or in the pump housing itself.

The solid phase can be continuously carried away, for example by means of the flow within the separation chamber or by means of a rotary vale or a cyclone separator, whereby it is guaranteed that the solid phase does not exit the separation chamber via the outlet for the liquid phase. It is likewise possible to effect a discontinuous removal of the solid phase from the separation chamber, for example by means of a control valve, the use of liquid slugs that are deliberately created in the pump operation, or by means of an inspection flap. If, during normal operation of the multiphase pump, the liquid phase is of insufficient quantity to carry away the solid phase that has collected in the separation chamber the creation of liquid slugs, i.e. the surging infeed of the liquid phase, can be deliberately interposed into the pump management in order to supply enough liquid phase to carry out the collected solid particles.

The gaseous phase can be removed from the separation chamber separately from the liquid phase by means of a gas outlet separated from the outlet for the liquid phase such that, according to the increase in pressure, a separate conveyance of the pumped hydrocarbons can be realized. If the compressed gaseous phase is not meant to be carried away together with the liquid phase and the solid phase, if any, a discharge-side phase separation can be carried out following pumping with the multiphase pump such that, simultaneously with the increase in pressure by the pump, a separation and phase separation of the pumped media is undertaken.

The supply of the liquid phase separated from the solid phase to the suction side can be carried out in a regulated manner, for example, as a function of measured values in respect of the composition of the multiphase flow to be pumped, in order to adjust the amount of recirculated liquid as needed. It is likewise possible to carry out the removal of gas from the separation chamber in a regulated manner in order to allow adjustment of the proportion of liquid phase and solid phase, if any, within the separation chamber and thereby also the amount of the liquid phase to be recirculated, as needed.

The liquid phase can be conducted from the separation chamber into a reservoir that is separated from the separation chamber, in order to be conducted from this reservoir to the recirculation bypass and thus to the suction side. By passing the separated liquid phase into the reservoir, a further equalization of the recirculation is enabled, since the liquid phase, freed from the solid phase, can be collected and stored as a reserve in the separation means. Thus, fluctuations in the in-feed flow do not directly affect the circulation, and therefore neither the lubrication, the sealing, nor the heat removal of the screw pump.

The liquid phase, freed from the solid phase, can still be filtered prior to the recirculation in order to keep unwanted particles away.

For purposes of removing the separated solid phase, the liquid phase can be intermittently conducted to the multi-phase pump and introduced into the separation chamber. This intermittent supply can originate either from the primary infeed medium, i.e. the multiphase mixture located on the suction side, or be removed from the separated and collected discharge-side liquid phase, so that already-processed liquid phase, i.e. liquid phase freed from solid phase portions, can be intermittently conducted from the discharge side, for example from a reservoir, to the suction side in order to carry away the solid phase collected in the separation chamber. Collection of the liquid phase can also take place on the inlet side, for instance by means of a suitable arrangement of supply pipes which can at least have ascending sections so that liquid phase in the lower-disposed sections is moved by the gaseous phase in surges toward the multiphase pump.

In order to carry the solid phase away from the separation chamber, sensors may be used which, for instance, initiate a removal depending on the fill level or, in the alternative, removal of the solid phase from the separation chamber can take place on a time-controlled basis. Depending on the sensor values, a liquid slug can be generated or the rotary valve activated, so that the solid phase removal can be undertaken as needed. The other removal mechanisms can likewise be initiated by means of sensor control.

Supply of the liquid phase to the suction side takes place by means of a recirculation line or a recirculation bypass in which at least one valve is arranged which can be completely opened at startup. In this way, a load-free startup of the apparatus can be enabled which, when starting the system, leads to reduced resistance and to energy savings. After startup and after reaching a stable operating point the valve can be closed to initiate the pumping process and the increase in pressure of the multiphase mix in the multiphase pump, so that the desired pressure level can be achieved. After reaching the desired pressure level the diameter of the valve in the recirculation line can be adjusted depending on the operating parameters to allow adjustment of the system according to changing conditions. For instance, enlargement of the diameter of the valve can thus be carried out when heating of the multiphase pump is detected, in order to allow the removal of heat present in the pump. When the liquid portion of the pumped multiphase mixture is sufficient, the diameter of the valve can be reduced in order to improve the efficiency of the system.

The apparatus according to the invention for pumping a multi-phase mixture charged with solids by means of a multi-phase pump which has a suction-side inlet and a discharge-side outlet, having a discharge-side separation means in which a liquid phase is separated from a gaseous phase and a recirculation line through which the separated liquid phase is transferred to the suction side provides at least one settling chamber formed in the separation means in which a solid phase is separated from a liquid phase, the settling chamber is connected to the outlet and a reservoir separate from the settling chamber is formed for liquid phase separated from the solid phase and which is connected to the recirculation line.

A settling chamber is formed in the separation means which particularly allows for a separation by gravity of liquid phase and solid phase. This settling chamber is arranged in a reduced-flow area of the separation means and allows for an effective separation of the solid phase from the liquid phase. The separation means can be formed as a separation chamber, which causes a reduction in the streaming velocity of the pumped multiphase mixture. The settling chamber is then a part of the separation chamber or a special section of the separation means. Other separation means for separating solid phase from liquid phase are also possible, for instance cyclone guides, to effect separation by means of inertia. A reservoir is separated from the settling chamber and is formed to receive the liquid phase separated from the solid phase, although this partition need not be formed by means of flow-dynamic obstacles, rather the reservoir may also be located in an area above the settling chamber, ensuring that solid phase material located in the liquid phase can sink into the settling chamber.

One embodiment of the invention provides separating the settling chamber from the reservoir by means of a partition wall, on which an overflow is formed or in which a passage is formed. The reservoir can thus provide a physical barrier to the settling chamber, so that under high flow velocities or turbulence within the settling chamber, resuspension of the settled solid phase occurs only within the settling chamber and no solid phase particles reach the reservoir. A passage may be present within the partition wall that, for example, can be opened or closed in a controlled manner in order to allow for the supplying of the reservoir with separate liquid phase depending on the fill level. If the partition wall has an overflow and a minimum of liquid phase and solid phase is present in the settling chamber, recirculation then takes place only if a minimum volume of liquid phase and solid phase is present in the settling chamber.

A filter may be arranged upstream of the recirculation line to hold back incompletely separated solid particles.

Because the increased pressure caused by the multiphase pump is prevalent within the separation means, a valve can be arranged upstream of or within the recirculation line to provide a controlled supply of the liquid phase. The time and the amount of recirculating liquid phase can be controlled by means of the valve.

A separate gas outlet for the separated gaseous phase can be formed in the separation means to allow for a separate removal of the gaseous phase. The gas outlet is thus advantageously situated higher than the outlet for the liquid phase and the solid phase.

The separation means may be arranged in a housing separate from the multiphase pump, which is particularly advantageous if the separation means is connected to a plurality of multiphase pumps. In the case of a plurality of multiphase pumps that are connected in parallel to a separation means outside of the pump housing of the multiphase pumps, individual pumps may be switched off for repair purposes. Furthermore, in this manner standard multiphase pumps can be simply retrofitted such that the structural costs are reduced. Often, space limitations are present, such that large-volume multiphase pumps having integrated separation means cannot be realized. A reduced-flow zone is formed within the separation means to effect separation of the gaseous phase from the liquid phase and the liquid phase from the solid phase, wherein the flow velocity of the multiphase mixture exiting the pump is reduced and the flow velocity is advantageously nearly zero in the reduced-flow zone to allow and to facilitate the separation of the individual phases.

A riser column and/or a U-shaped section of pipe can be arranged in front of the inlet of the multiphase pump, whereby liquid phase can be collected within the pipe upstream of the inlet, and can then be forced into the multiphase pump when a specified pressure level is achieved by the gaseous phase. The liquid phase and solid phase located within the separation means are carried away through the use of this liquid slug, whereby in addition a removal of heat is effected by means of the exchange of the heated substances located within the pump housing or in the separation means, which has a positive effect on the pump's ability to pump multiphase mixtures having a very high gaseous component.

A separate, closeable discharge opening for the separated solid phase can be formed within the separation means, the discharge opening is different from the discharge opening through which the liquid phase and the gaseous phase, if any, are carried away. The discharge opening may be fitted with a cyclone separator, a rotary valve and/or a control valve to allow removal of the accumulated solid phase in the settling chamber from the separation apparatus as far as possible without interruption of the pumping function.

Figure 2:
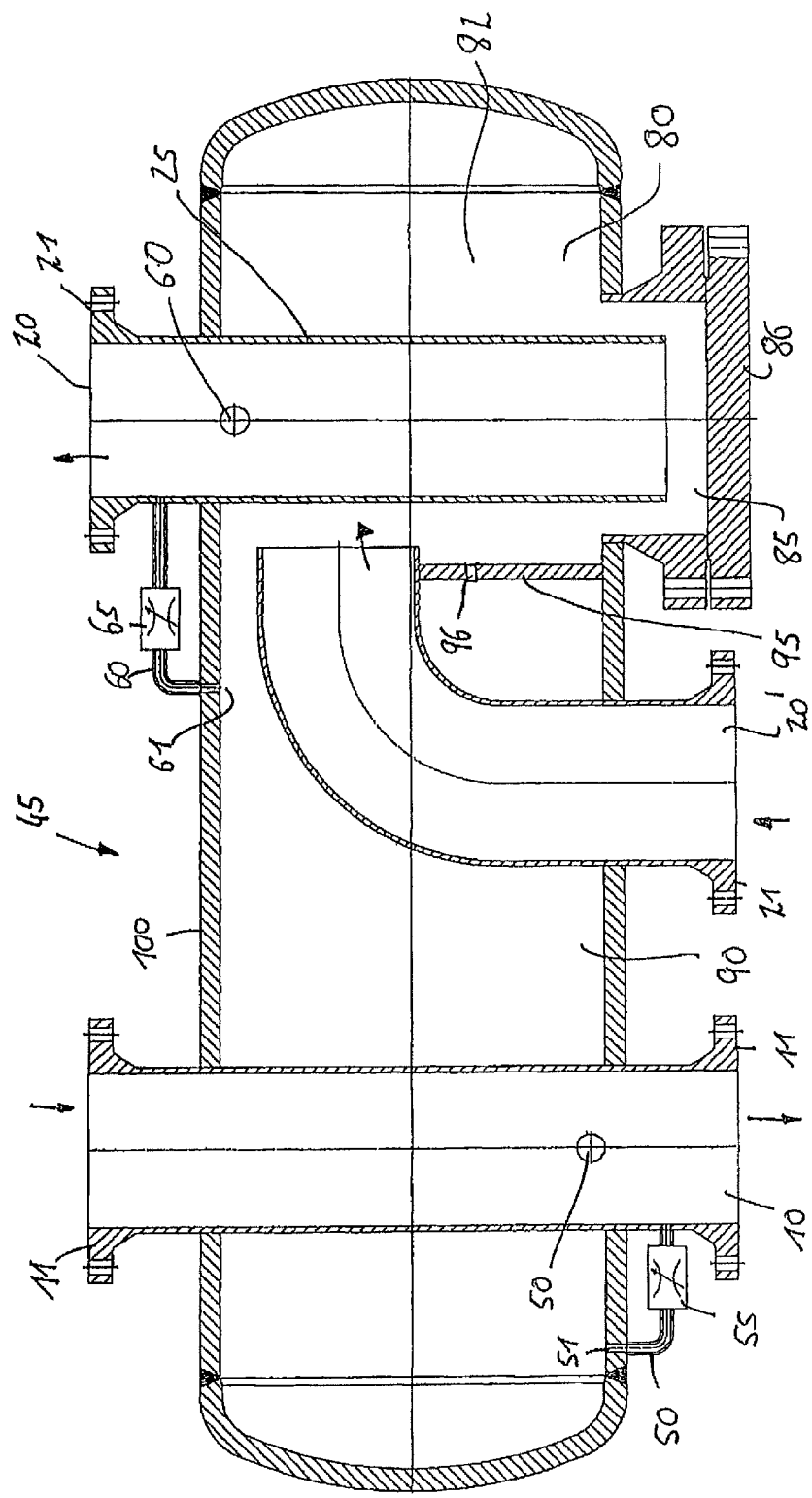
Figure 3:
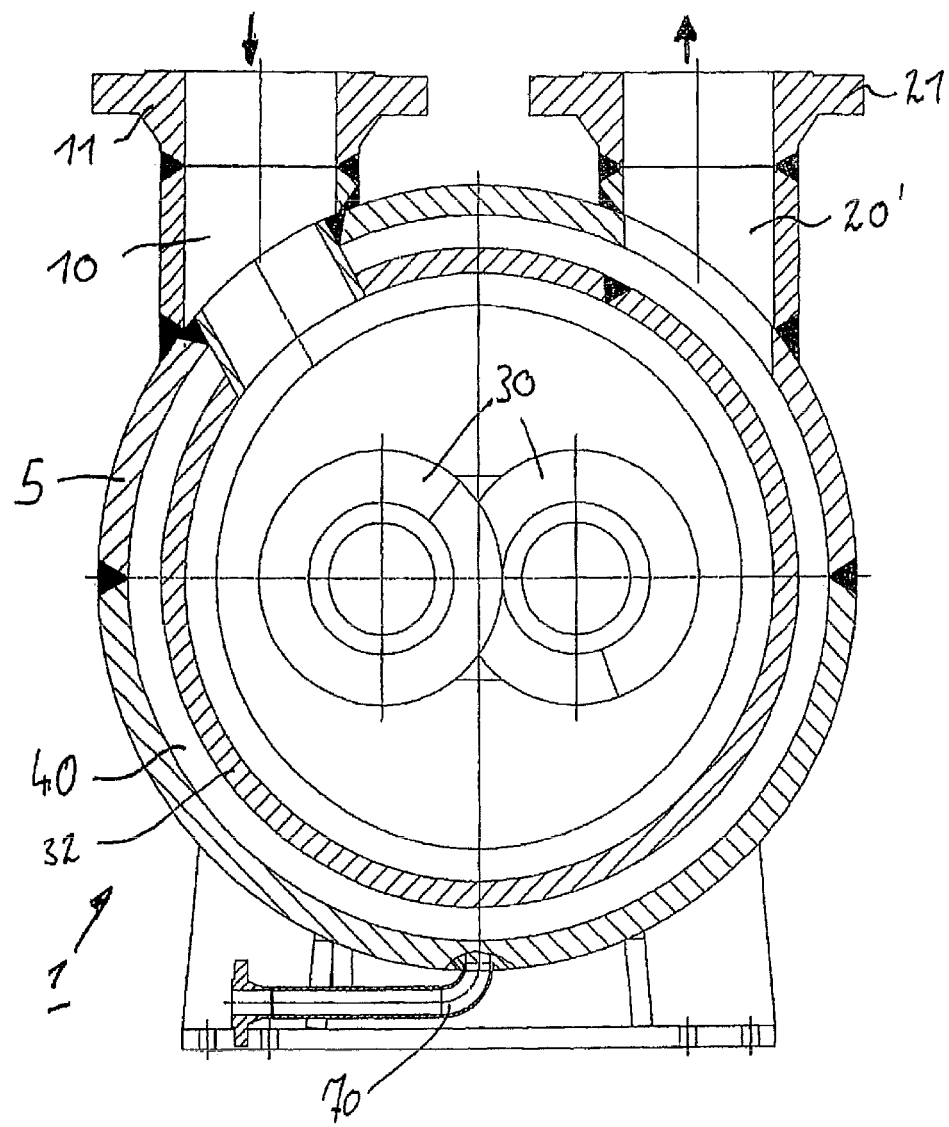
Figure 4:
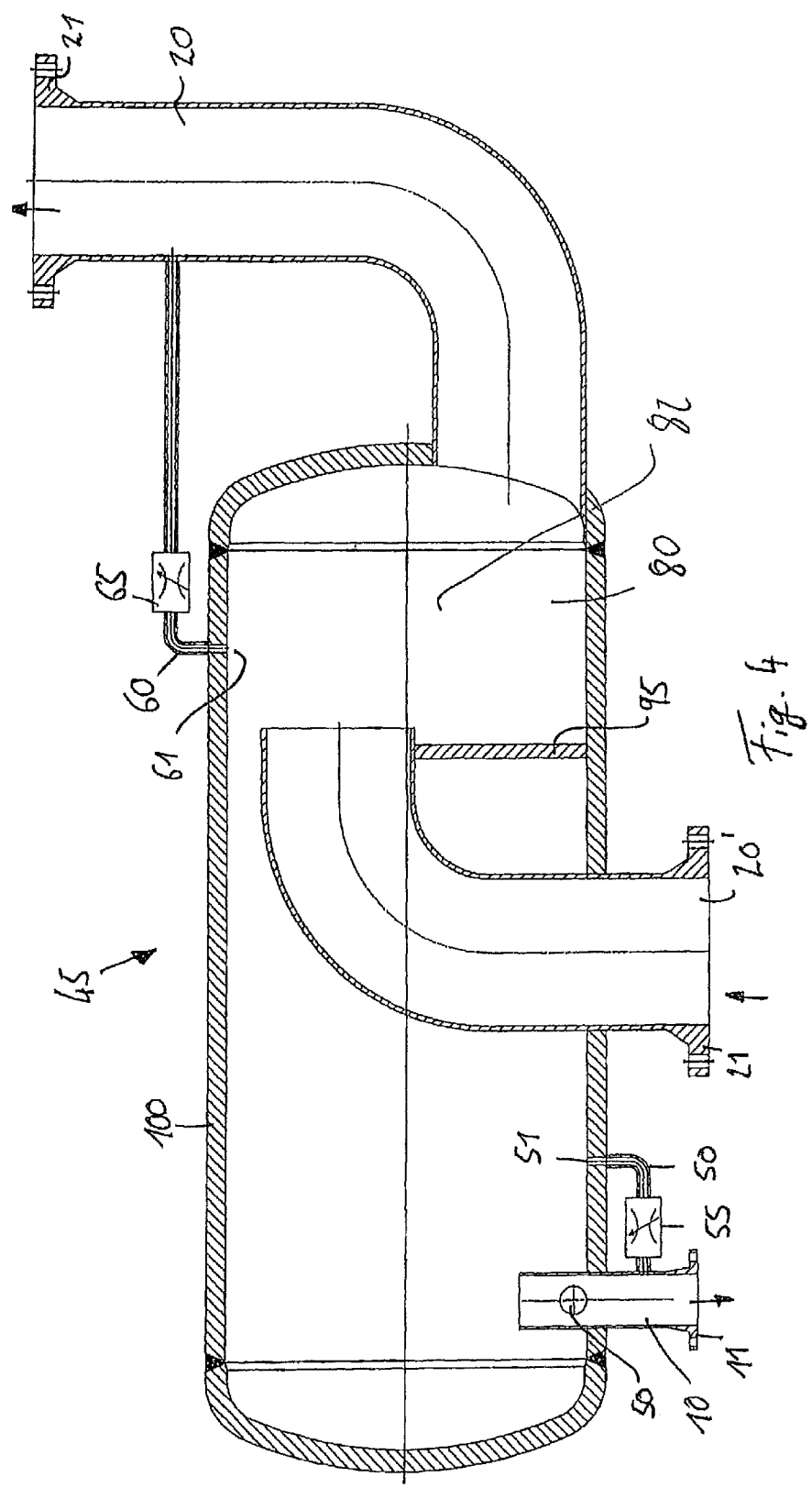

Embodiments of the invention will be described in grater detail in the following with reference to the attached drawings. What is depicted is:

FIG. 1—a schematic cross-sectional view through a pump;

FIG. 2—a schematic cross-sectional view of a separation means;

FIG. 3—a pump to be connected to the separation means according to FIG. 2;

FIG. 4—a variation of the separation means; and

Figure 5:
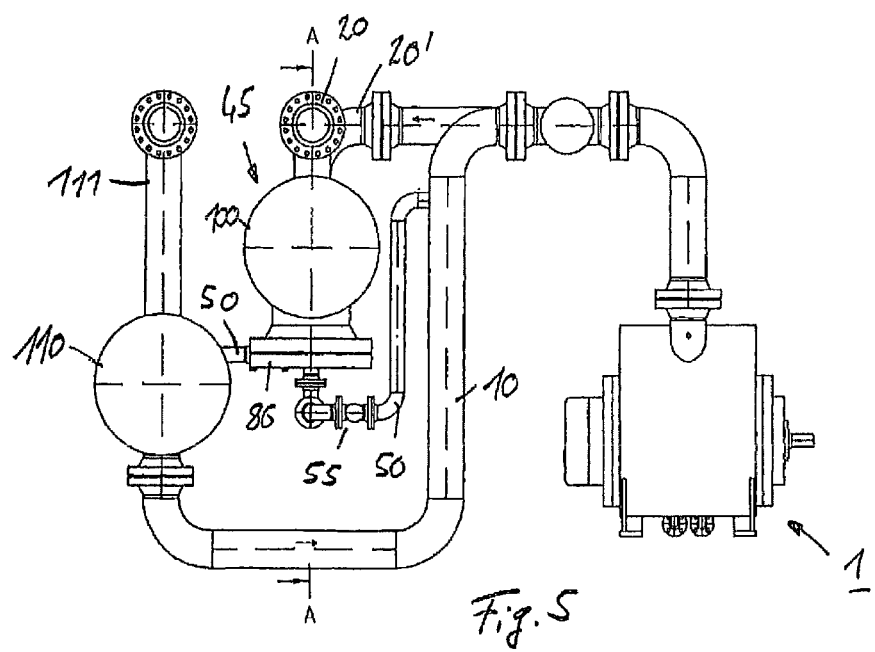
Figure 6:
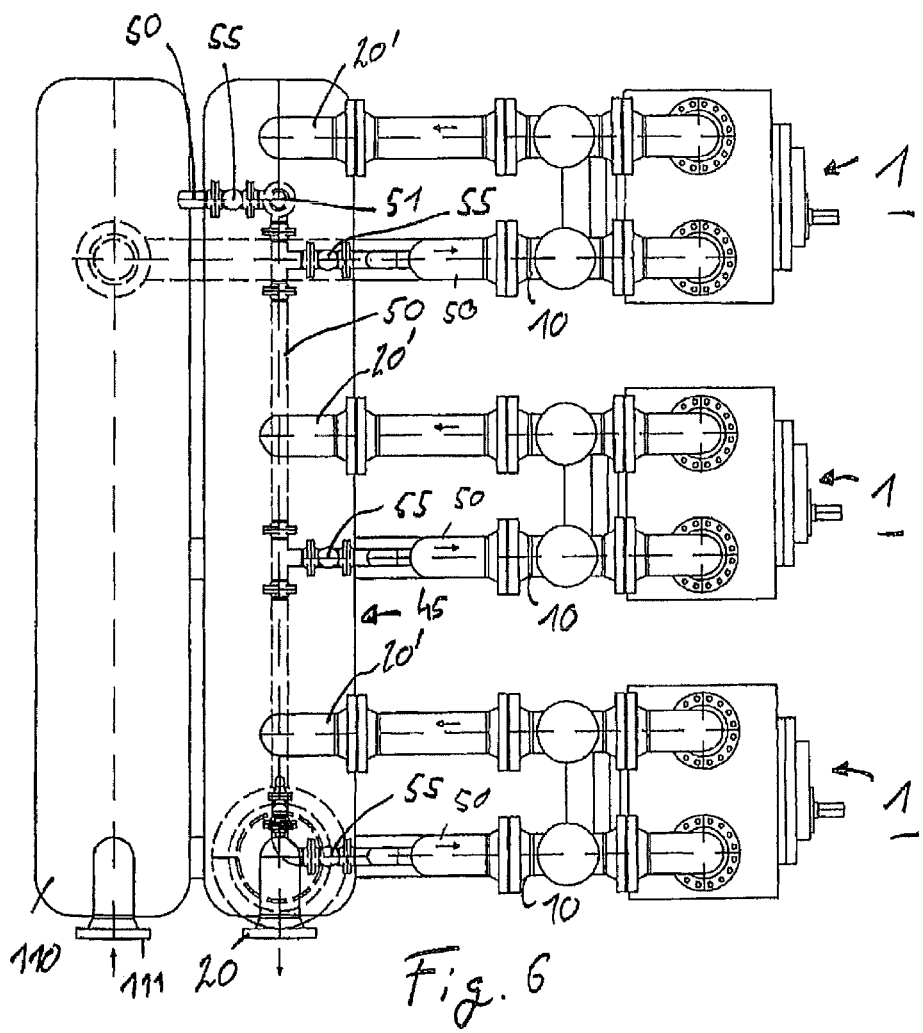
Figure 7:
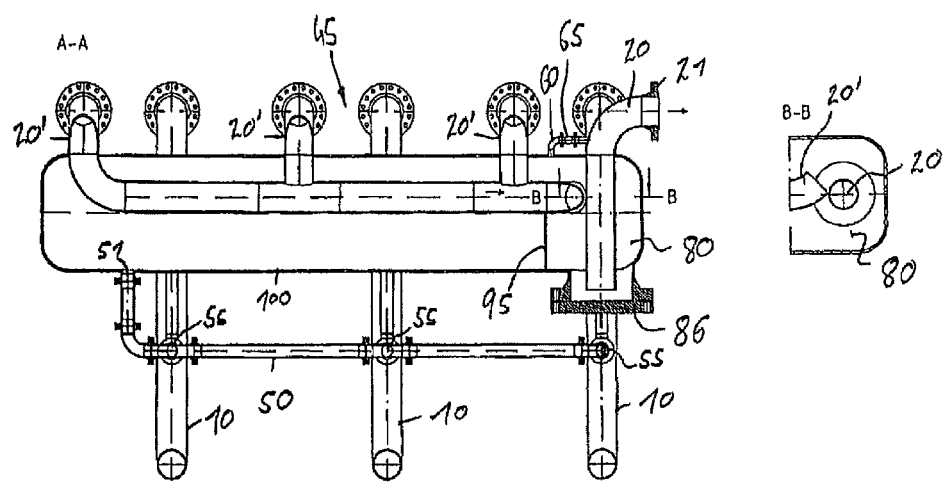

FIGS. 5 through 7—a parallel arrangement of pumps with one separation means.

In FIG. 1 an apparatus for pumping a multiphase mixture charged with solids is depicted, which is configured as a multiphase pump 1. The multiphase pump 1 has a housing 5 in which an inlet 10 having an inlet stub 11 and a discharge outlet 20 with discharge stub 21 are arranged. A pair of screws 30 is arranged within the housing, which is mounted within a pump housing 32. The screws 30 may be arranged as a two-spindle, double-flow screws in which the direction of flow can move outward from the middle of the screws 30. The pumped multiphase mixture charged with solids is thus conducted through the inlet 10 centrally to the screws 30, whereby the so-called suction chamber is formed up to the screws 30. In the embodiment depicted the suction chamber surrounds the screws 30. The multiphase mixture is pumped from the middle of the screws 30 perpendicular to the drawing plane outward on both sides and from there reaches the pressure chamber 40, which encloses the screws 30 together with the pump housing 32 that surrounds the screws 30.

The housing 5 has a downwardly directed slant beneath the screws 30 and a pressure-side separation means 45 which is formed by an enlargement in the cross-section of the pressure chamber 40 in the direction of the discharge outlet 20. By providing an enlarged volume and flow cross-section the flow velocity within the pressure chamber 40 is reduced such that a separation of the phases present in the multiphase mixture takes place. The gaseous phase, which has the smallest specific weight will rise upward, the liquid phase will separate in the middle, and the solid phase, which has the greatest specific weight, will settle to the bottom.

A gas discharge outlet 61 is formed in an upper region of the housing 5, through which separated gaseous phase can be separately conducted. A pipe 60 is connected to the gas discharge outlet 61, in which a valve 65 is arranged, advantageously a control valve, which can be opened or closed depending on the desired output rate. It is possible to transport the gaseous phase by means of the gas discharge outlet 61 separately after the increase in pressure by the screws 30; in the alternative it is possible for the pipe 60 to open into the discharge outlet 20 in order to carry the gaseous phase away through the discharge outlet 20 together with the remaining components of the multiphase mixture. If the valve 65 is closed, the gaseous phase can be transported away via the common discharge outlet 20, which is arranged in the floor area beneath the screws 30. Instead of an external pipe 60 with a valve 65 it is possible to provide a throughbore in the upper region of the housing 5 at the discharge outlet 20, such that a direct bypass 60 is realized within a perpendicularly downwardly directed outlet pipe 25 provides a bypass to the discharge outlet 20. This allows for a simple means for separation and removal of the gaseous phase from the pressure chamber 40. The discharge outlet 20 conducts the multiphase mixture upward out of the housing on the discharge side, whereas the opening of the discharge outlet 20 in the pressure chamber 40 is arranged beneath the screws 30. In principle, it must be noted that there is always a minimum cross-sectional area for passage of the separated gaseous phase present in a transport line, since otherwise a preferred removal of the liquid phase would occur via the discharge outlet 20.

In the area of the configuration of the housing 5 with the enlarged volume, which serves as a separation means 45, a settling chamber is arranged in the lower region to receive solid particles which settle to the bottom due to flow reduction. The settling chamber 80 is arranged on the lower end of the housing 5 and is located beneath the screws 30 which provide an increase in pressure. An obliquely downwardly directed wall of the housing 5 leads from these screws 30 to the settling chamber 80, such that solids located at a higher level are conducted downward. A discharge outlet 85 is formed in the settling chamber 80, which is closed by means of a closure 86. A reduced-flow region 82 is formed above the settling chamber 80 to allow the separation of the liquid phase and the gaseous phase by means of gravitational separation. Instead of a permanent closure 86, which is formed as an inspection flap, the discharge outlet 85 can be arranged as a valve, a cyclone separator or a rotary valve, so that the collected solid phase can be transported away from the settling chamber 80 as needed.

A liquid outlet 51 is provided above the settling chamber 80 on the discharge side 40 in the housing 5, in which a recirculation line 50 is connected. The recirculation line 50 leads from the discharge side 40 to the suction side in the inlet 10. A control valve 55 is provided in the recirculation line 50, which can be opened or closed as needed to allow a regulated recirculation from the discharge side 40 to the suction side. The liquid outlet 51 for the recirculation bypass 50 lies above the settling chamber 80 and below the screws 30. By means of the arrangement of the liquid outlet 51 above the settling chamber 80, only liquid phase from which the solid phase has already settled out is conducted into the recirculation line 50. By means of the settling action and the separation in the reduced-flow region 82 a reservoir 90 is formed above the settled solid phase, from which the recirculated liquid is taken.

In FIG. 1 there is provided as an alternative or in addition to the described recirculation line 50 with the valve 55 a further recirculation line 50 in the form of an opening or bore in the pump housing 32. The bore or opening provides a connection from the suction chamber within the pump housing 32 to the pressure chamber 40 exterior to the pump housing 32 and with the housing 5. By means of the upward orientation of the opening 50 the heavier solid particles are not or are at least preferably less transported to the suction side, moreover the arrangement of the opening 50 is geodetically upwardly positioned such that a separation of the solid phase and the liquid phase will have already occurred and only separated liquid phase can reach the corresponding water level.

During an operation involving mixed compositions of the multiphase mixture the entire pressure chamber 40 is filled with the multiphase mixture. If the gas pipes 60 are closed, the entire multiphase mixture to be pumped will be transported away through the riser column 25 and the discharge outlet 20 out of the multiphase pump 1 having the separation means 45 integrated in the housing 5. In that case the riser column 25 opens beneath the level of the screws 30 and the pump housing 32 and transports the multiphase mixture out of the pressure chamber 40 to the flange 21. Solid phase separated and accumulated in the settling chamber 80 is thereby carried out together with the liquid phase. If the flow velocity is insufficient to carry away the solids located within the settling chamber 80, the accumulated solids can be removed from the pressure chamber 40 during operation by means of a rotary valve or other suitable means. Alternatively, it is possible to flush the solid accumulations out by means of so-called liquid slugs.

By positioning the liquid outlet 51 above the settling chamber 80 in the direction of gravity, the liquid phase freed from solid phase is recirculated, in order to seal the gap between the screws 30 and the pump housing 32 and to provide lubrication. The abrasive solid particles are largely held back because they are located beneath the reservoir 90 in the settling chamber 80. A physical separation between the reservoir 90 and the settling chamber 80 is not provided in the embodiment depicted; flow inhibitors may be arranged within the housing 5 inside the pressure chamber 40, which retain solid particles or impede transport in the direction of the liquid outlet 51. These flow inhibitors can be formed in the shape of labyrinthine guides or dams, for example.

An additional outlet 70 is arranged on the lower end of the housing 5, which is used to empty the pump for maintenance and repair purposes and is closed during normal operation.

A variation of the invention is depicted in FIG. 2, in which the separation means 45 is formed as a separate component. The separation means 45 can be connected to a multiphase pump 1 according to FIG. 3.

In FIG. 3, a conventional multiphase pump 1 in the form of a screw pump is depicted. Here the screws 30 are likewise arranged within a pump housing 32, which is mounted inside a pressure chamber 40 within the housing 5. The medium to be pumped is conducted via the inlet 10 on the inlet stub 11 to the screws 30, from there perpendicular to the drawing plane outwardly into the pressure chamber 40, which surrounds the pump housing 32 of the pumping screws 30. The pumped multiphase mixture is transported away from the pressure chamber 40, which is formed as an annular space, via the pump outlet 20'.

In FIG. 2, the separation means 45 is shown as a separate component with the corresponding connection stubs. The inlet stubs 11 for the inlet 10 provide the connection to the inlet stubs 11 of the multiphase pump 1 according to FIG. 3; the inlet stub 11 leads perpendicularly through a tubular housing 100. The pump outlet 20' likewise leads into this housing 100, which is connected via outlet stubs 21 to the outlet stubs 21 of the multiphase pump 1 according to FIG. 3. The multiphase mixture is conducted from the inlet 10, through the multiphase pump 1 and the pump outlet 20' of the multiphase pump 1 according to the arrows, into the separation chamber 45, and from there via the outlet 20 to the transport pipes or to a further processing means. The inlet of the separation chamber 45 is formed as a 90° tube, so that the multiphase mixture is transported substantially horizontally into the separation chamber 45.

A settling chamber 80 having a reduced-flow zone 82 is provided within the separation chamber 45, into which the multiphase mixture pumped out of the multiphase pump 1 is conducted. A discharge outlet 85 having a closure 86 is likewise provided here on the underside of the settling chamber 80. The riser column 25 leads perpendicularly upward from the settling chamber 80.

The settling chamber 80 is connected to a reservoir 90 via a partition wall 95 in which a passage is formed. Liquid phase substantially freed from solid phase is collected in the reservoir 90, which can again be recirculated to the inlet 10 via a recirculation line 50. Here as well in one embodiment a control valve 55 is arranged within the recirculation line 50; alternatively or in addition thereto a bypass 50 can be arranged through a bore within the suction stub of the inlet 10. In order to improve the quality of the liquid phase it is possible to arrange multiple partition walls 95 one after another upstream of the recirculation lien 50, each of which allows for the transport of liquid phase via passages 96 or overflows in the direction of the bypass 50. By this means, a series of settling chambers 80 and reduced-flow areas 82 within the housing 100 is created. Thus, a multi-stage separation of liquid phase and solid phase is provided and possible.

A gas discharge outlet 61 having a gas line 60 and a valve 65 is provided in the upper region of the housing 100 such that the separate gaseous phase within the housing 100 can be transferred either to the outlet 20 or to a separate gas line. Similar to the liquid phase with the recirculation line 50, there is provided here as well a bore 60 as a line from the separation chamber within the housing 100 to the outlet 20.

A variation of the invention is depicted in FIG. 4. The principle of the separate separation chamber 45 corresponds to that of FIG. 2, although the inlet 10 for the multiphase pump is not conducted from the source through the wall of the housing. The connection to the multiphase pump 1 according to FIG. 3 occurs via the discharge stubs 21, whereas the inlet 10 of the multiphase pump 1 is connected to a delivery pipe or the like. In the separation means according to FIG. 4 the separated liquid phase is then connected by the recirculation line 50 to the suction side via an inlet 10 which is not connected to the supply line, so that the separated liquid phase is conducted on the suction side into the inlet 10 of the screw pump.

Apparatuses for collecting liquid phase can be provided on the suction side of the multiphase pump 1, for example U-shaped pipelines, tanks or reservoirs by means of which controlled amounts of liquid phase are delivered to the inlet side so that, on the one hand, a large amount of heat can be transported away from the housing 5 of the multiphase pump 1 and, on the other hand, accumulated solid phase can be carried out of the separation means 45.

In FIG. 4 the outlet 20 from the settling chamber 80 is horizontally disposed such that settled solid phase can be easily transported out of the settling chamber 80. A certain backflow of the multiphase mixture is caused by the upwardly-bending outlet 20 such that a separation and a sinking of the solid phase is effected within the settling chamber.

In FIG. 5 an arrangement of a plurality of multiphase pumps 1 connected in parallel is depicted in a side elevation which is equipped with a separate separation chamber 45 and an upstream collection means 110 into which the pumped multiphase mixture is supplied and initially collected from a supply pipe, which is not shown, by means of an inlet stub 111. From the collection container 110 for each multiphase pump 1, inlet piping leads to the inlet 10 of each respective multiphase pump 1. The inlet piping is formed in a U-shape and serves to create liquid slugs in a controlled manner. The liquid collects in the lower portion by means of the U-shaped structure of the inlet piping, wherein a sufficiently large pipe diameter prevents any pneumatic advancement of the remaining media. Within the U-shaped section of the inlet piping the liquid phase charged with solids and the gaseous phase separate from one another in the horizontal piping section. The liquid phase charged with solids is retained and collected, while the gaseous phase then flows above it through the piping. With increasing fluid volume within the horizontal piping sections the flow diameter of the gaseous phase is decreased such that, based on the difference in velocity between the gaseous phase and the liquid phase charged with solids, waves are formed at the phase boundary which completely block the flow path of the gaseous phase. When this phenomenon occurs the gaseous phase pushes the liquid plugs so formed ahead of itself over the rising section which connects to the horizontal section of the piping, upward and into the inlet 10 of the multiphase pump 1. The frequency of the liquid slugs and their volume is determined by the interplay between the individual pumping parameters such as the amount pumped and gaseous component and the geometric parameters of the piping such as diameter, length of the horizontal portion and the height difference of the rising section.

In addition to the collection container 110, the housing 100 of the separate separation means 45 can also be seen in FIG. 5, which is connected to the multiphase pump 1 via the pump outlets 20'. A common outlet 20 leads from the separation means 45 to the transport lines. A recirculation line 50 having a valve 55 is arranged on the underside of the housing 100 and leads into the inlet 10 of the pump 1. The frequency and the volume of the liquid slugs can be adjusted via a controlled supply of separated liquid phase according to the arrangement and junction of the recirculation line 50 with the rising section of the supply line. An additional recirculation line 50, which can be provided with a valve, leads from the separation means 45 to the collection container 110, allowing for the control of which section of the inlet piping or the suction side the separated liquid phase is recirculated into.

In FIG. 6 the parallel arrangement of three multiphase pumps 1 can be seen in a plan view of an arrangement according to FIG. 5. The pumpable multiphase mixture, which is suppliable from a source, is conducted through an inlet stub 111 into the collection container 110. From this collection container 110 three U-shaped inlet pipes lead underneath the separation means 45 through to the inlets 10 of the multiphase pumps 1 in the embodiment depicted. After pumping the multiphase mixture is conducted into the separation apparatus 45 via the pump outlets 20', separated there and transported away through the outlet 20. On the underside of the housing 100 a common liquid outlet 51 is arranged which is connected to a pipeline from which the recirculation lines 50 lead to the inlets 10 and the collection containers 110 on the suction sides of the pumps 1.

A control valve 55 is assigned to each recirculation line 50 to provide a controlled supply of separated liquid phase adapted to each pump 1. Thus it is possible, for example when starting up the pump to provide a complete opening of the recirculation line 50 and consequently a diminished counter-pressure such that a substantially load-free and energy-efficient startup of a pump 1 can occur.

In FIG. 7 a cross-sectional view along the line A-A of FIG. 5 is shown. The separate separation means 45 is shown in a cross-sectional view next to the inlet piping on the suction side. The pump outlets 20' lead into the housing 100 in a common pipe, which enters into the settling chamber 80 within the housing 100. The partition wall 95 is shown as is the closure 86, the structure otherwise corresponding substantially to the structure according to FIG. 4, the bypass line 60 having a valve 65 for the gaseous phase leading out of the upper region of the housing 100 directly to the discharge outlet 20.

In the right-hand depiction of FIG. 7, which is a cross-sectional view along the line B-B, it can be seen that the collection pipe of the pump discharge outlets 20' opens substantially perpendicularly into the settling chamber 80. From there the discharge outlet 20 leads substantially perpendicularly upward and then bends horizontally in order to allow the multiphase mixture to be transported away. Following the separation of the liquid phase from the solid phase in the settling chamber the separated liquid phase is conducted away over the partition wall 95 into the housing 100 of the separation means 45. The liquid phase separated from the solid phase flows from the liquid outlet formed as an opening on the floor via the recirculation line 50 having the individual valves 55 to the inlet piping 10 on the suction side of the multiphase pumps 1. The closure 86 can be seen on the underside of the settling chamber 80.

The invention claimed is:

1. A multiphase screw pump for pumping a multi-phase mixture charged with solids, the multiphase screw pump comprising:
    a suction-side inlet on a first side of the multiphase screw pump;
    a discharge-side outlet on a second side of the multiphase screw pump, wherein the second side of the multiphase screw pump includes a pressure-side separation chamber in which a liquid phase is separated from a gaseous phase;
    screws effective to pump the multi-phase mixture from the first side of the multiphase screw pump into the pressure-side separation chamber on the second side of the multiphase screw pump;

a recirculation line through which the separated liquid phase is supplied to the first side of the multiphase screw pump;

at least one settling chamber disposed within the pressure-side separation chamber in which a solid phase is separated from the liquid phase and a reservoir separated from the settling chamber is formed for the liquid phase separated from solids; and a valve arranged in the recirculation line, wherein the valve is configured to close and increase a pressure of the multi-phase mixture within the multiphase screw pump.

2. The multiphase screw pump according to claim 1, wherein the at least one settling chamber is separated from the reservoir by a partition wall.

3. The multiphase screw pump according to claim 1, wherein a filter is upstream of the recirculation line.

4. The multiphase screw pump according to claim 1, wherein the valve is further configured to regulate a recirculation of the liquid phase.

5. The multiphase screw pump according to claim 1 further comprising a gas discharge outlet for the separated gaseous phase in the pressure-side separation chamber.

6. The multiphase screw pump according to claim 1, wherein the pressure-side separation chamber is in a separate housing from the multiphase screw pump.

7. The multiphase screw pump according to claim 1, wherein a reduced-flow region is formed in the pressure-side separation chamber.

8. The multiphase screw pump according to claim 1, wherein a riser and/or a U-shaped pipe section is upstream of the suction side inlet of the multiphase screw pump.

9. The multiphase screw pump according to claim 1 further comprising a discharge outlet for the separated solid phase in the pressure-side separation chamber.

10. The multiphase screw pump according to claim 9, wherein the discharge outlet is closable and includes a cyclone separator, a rotary valve and/or a control valve.

11. The multiphase screw pump according to claim 1, wherein the settling chamber is connected to the discharge-side outlet.

12. The multiphase screw pump according to claim 1, wherein the multiphase screw pump is a screw spindle pump.

13. The multiphase screw pump according to claim 12, wherein a liquid outlet of the recirculation line is above the at least one settling chamber and below the screws.

14. The multiphase screw pump according to claim 1, wherein the separation chamber includes cyclone guides to separate the solid phase from the liquid phase by inertia.

* * * * *